US005780954A

United States Patent [19]

Davis

[11] Patent Number: 5,780,954

[45] Date of Patent: Jul. 14, 1998

[54] THERMIONIC ELECTRIC CONVERTERS

[76] Inventor: Edwin D. Davis, 1350 S. Peninsula Dr., Daytona Beach, Fla. 32118

[21] Appl. No.: 787,476

[22] Filed: Jan. 22, 1997

[51] Int. Cl.[6] .............................. H01J 45/00; H02N 3/00

[52] U.S. Cl. .............................. 310/306

[58] Field of Search .............................. 310/306, 10, 11, 310/310; 376/321; 322/2 R

[56] References Cited

U.S. PATENT DOCUMENTS

| | | | |
|---|---|---|---|
| 3,149,253 | 9/1964 | Luebke | 310/11 |
| 3,165,652 | 1/1965 | Prater | 310/11 |
| 3,225,227 | 12/1965 | Biehl | 310/11 |
| 3,313,961 | 4/1967 | Bensimon et al. | 310/4 |
| 3,328,611 | 6/1967 | Davis | 310/4 |
| 3,358,162 | 12/1967 | Krake et al. | 310/4 |
| 3,519,854 | 7/1970 | Davis | 310/4 |
| 3,596,131 | 7/1971 | Wilczek | 315/39.3 |
| 4,280,074 | 7/1981 | Bell | 310/306 |
| 4,281,280 | 7/1981 | Richards | 310/6 |
| 4,303,845 | 12/1981 | Davis | 310/6 |
| 4,323,808 | 4/1982 | Davis | 310/306 |
| 4,405,878 | 9/1983 | Oliver | 313/346 R |
| 5,459,367 | 10/1995 | Davis | 310/306 |

*Primary Examiner*—Thomas M. Dougherty

*Attorney, Agent, or Firm*—William L. Feeney; Kerkam, Stowell, Kondracki & Clarke,P.C.

[57] ABSTRACT

An improved thermionic electric converter uses a wire grid cathode to provide a larger surface area for electrons to boil off. Alternately or additionally, the larger electron emission surface area can be achieved by using a curved electron emission surface. A laser provides quantum interference to electrons just before they reach the anode, thereby lowering their energy levels such that they more readily are captured by the anode. The arrangement provides improved conversion efficiency and reduced electron scatter.

18 Claims, 3 Drawing Sheets

LASER
COOLANT
EXTERNAL CIRCUIT
HEAT SOURCE
200
202
202A
204
206
208
210
212
214
216
218
220
222
224
226
228
230
232
234
236
238
240
242
244
246
248
250
250'
252
254
254'
256
258
260
262
264
266
268
270
220'
220A'
280
A
EA

THERMIONIC ELECTRIC CONVERTERS

FIELD OF THE INVENTION

The present invention relates generally to the field of converting heat energy directly to electrical energy. More particularly, an improved thermionic electric converter is provided.

BACKGROUND OF THE INVENTION

Heretofore, there have been known thermionic converters such as those shown in U.S. Pat. Nos. 3,519,854, 3,328,611, 4,303,845, 4,323,808, and 5,459,367 (all to the inventor of the present invention and all hereby incorporated by reference), which disclose various apparatus and methods for the direct conversion of thermal energy to electrical energy. In U.S. Pat. No. 3,519,854, there is described a converter using Hall effect techniques as the output current collection means. The '854 patent teaches use of a stream of electrons boiled off of an emissive cathode surface as the source of electrons. The electrons are accelerated toward an anode positioned beyond the Hall effect transducer. The anode of the '854 patent is a simple metallic plate, which has a heavily static charged member circling the plate and insulated from it.

U.S. Pat. No. 3,328,611 discloses a spherically configured thermionic converter, wherein a spherical emissive cathode is supplied with heat, thereby emitting electrons to a concentrically positioned, spherical anode under the influence of a control member and having a high positive potential thereon and insulated from. As with the '854 patent, the anode of the '611 patent is simply a metallic surface.

U.S. Pat. No. 4,303,845 discloses a thermionic converter wherein the electron stream from the cathode passes through an air core induction coil located within a transverse magnetic field, thereby generating an EMF in the induction coil by interaction of the electron stream with the transverse magnetic field. The anode of the '845 patent also comprises a metallic plate which has a heavily static charged member circling the plate and insulated from it.

U.S. Pat. No. 4,323,808 discloses a laser-excited thermionic converter that is very similar to the thermionic converter disclosed in the '845 patent. The main difference is that the '808 patent discloses using a laser which is applied to a grid on which electrons are collected at the same time the potential to the grid is removed, thereby creating electron boluses that are accelerated toward the anode through an air core induction coil located within a transverse magnetic field. The anode of the '808 patent is the same as that disclosed in the '845 patent, i.e., simply a metallic plate which has a heavily static charged member circling the plate and insulated from it.

U.S. Pat. 5,459,367 advantageously uses an improved collector element with an anode having copper wool fibers and copper sulfate gel instead of a metallic plate. Additionally, the collector element has a highly charged (i.e., static electricity) member surrounding the anode and insulated from it.

Another prior design has an anode and cathode which are relatively close together such as two microns apart within a vacuum chamber. Such a prior design uses no attractive force to attract electrons emitted from the cathode to the anode other than induction of cesium into the chamber housing the anode and cathode. The cesium coats the anode with a positive charge to keep the electrons flowing. With the cathode and anode so close together, it is difficult to maintain the temperatures of the cathode and anode at substantially different temperatures. For example, one would normally have the cathode at 1800 degrees Kelvin and the anode at 800 degrees Kelvin. A heat source is provided to heat the cathode and a coolant circulation system is provided at the anode in order to maintain it at the desired temperature. Even though the chamber is maintained at a vacuum (other than the cesium source), heat from the cathode goes to the anode and it takes a significant amount of energy to maintain the high temperature differential between the closely spaced cathode and anode. This in turn lowers the efficiency of the system substantially.

OBJECTS AND SUMMARY OF THE INVENTION

Accordingly, an object of the present is to provide and new and improved thermionic electric converter.

A more specific object of the present invention is provide a thermionic electric converter with improved conversion efficiency.

Yet another object of the present invention is to provide an improved cathode for a thermionic electric converter.

A further object of the present invention is to provide a thermionic electric converter having the cathode and anode spaced apart significantly such that they are relatively thermally isolated from each other.

Yet another object of the present invention is to provide a thermionic electric converter wherein energy can be removed from electrons just before they strike the anode.

The above and other objects of the present invention, which will be apparent as the description proceeds, are realized by a thermionic electric converter having a casing member, a cathode within the casing member operable when heated to serve as a source of electrons, and an anode within the casing member operable to receive electrons emitted from the cathode. The cathode is a wire grid having wires going in at least two directions that are transverse to each other. A charged first focusing ring is in the casing member, between the cathode and the anode, and is operable to direct electrons emitted by the cathode through the first focusing ring on their way to the anode. A charged second focusing ring is in the casing member, between the first focusing ring and the anode, and is operable to direct electrons emitted by the cathode through the second focusing ring on their way to the anode. Additional focusing rings may be necessary. The cathode is preferably separated from the anode by 4microns to five centimeters. More preferably, the cathode is separated from the anode by one to three centimeters. A laser operable to hit electrons (i.e., apply a laser beam to the electrons) between the cathode and anode. The laser hits the electrons just before they reach the anode. The laser is operable to provide quantum interference with the electrons such that electrons are more readily captured by the anode.

The wire grid of the cathode preferably includes at least four layers of wires. Further, each of the wire layers has wires extending in a different direction from each of the other of the wire layers, the wire grid of the cathode thus including wires extending in at least four different directions. This is designed to greatly increase the emissive surface of the cathode.

The present invention may alternately be described as a thermionic electric converter having a casing member, a cathode within the casing member operable when heated to serve as a source of electrons, an anode within the casing member operable to receive electrons emitted from the cathode; and a laser operable to hit electrons between the cathode and anode. The laser thus provides quantum interference with the electrons such that electrons are more readily captured by the anode. The laser is operable to hit electrons just before they reach the anode. The laser is operable to hit electrons within 2 microns of when they reach the anode. The cathode is a wire grid having wires going in at least two directions that are transverse to each other. The cathode is separated from the anode by 4 microns to five centimeters.

The present invention may alternately be described as a thermionic electric converter having a casing member, a cathode within the casing member operable when heated to serve as a source of electrons, and an anode within the casing member operable to receive electrons emitted from the cathode and which proceed generally along a movement direction defining the direction from the cathode to the anode. The cathode has a planar cross section area normal to the movement direction, the cathode has an electron emission surface area for electron emission towards the anode, and the electron emission surface area is at least 30 percent greater than the planar cross section area. The cathode is a wire grid having wires going in at least two directions that are transverse to each other. Alternately, or additionally, the cathode is curved in at least one direction perpendicular to the movement direction. A laser operable to hit electrons between the cathode and anode just before they reach the anode. Preferably, the electron emission surface area is at least double the planar cross section area. More preferably, the electron emission surface area is at least double the planar cross section area. The smaller the diameter of the wire the larger the emissive area. This is an exponential relationship.

BRIEF DESCRIPTION OF THE DRAWINGS

The invention will be described in detail herein with reference to the following figures in which like reference numerals denote like elements, and wherein.

DETAILED DESCRIPTION OF THE PREFERRED EMBODIMENT

Figure 1:
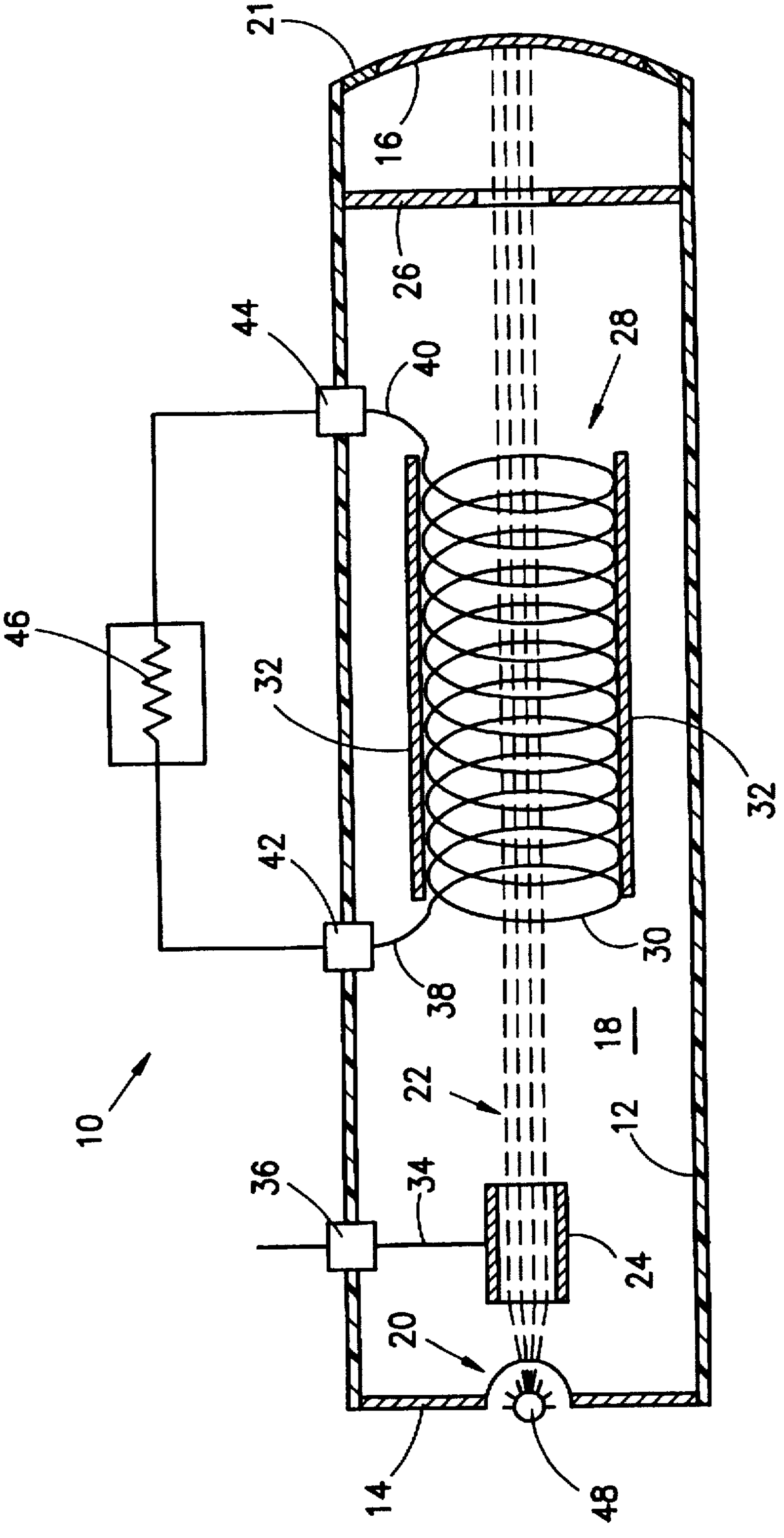
FIG. 1 PRIOR ART
FIG. 1 is a schematic diagram of a prior art thermionic electric converter.
Figure 2:
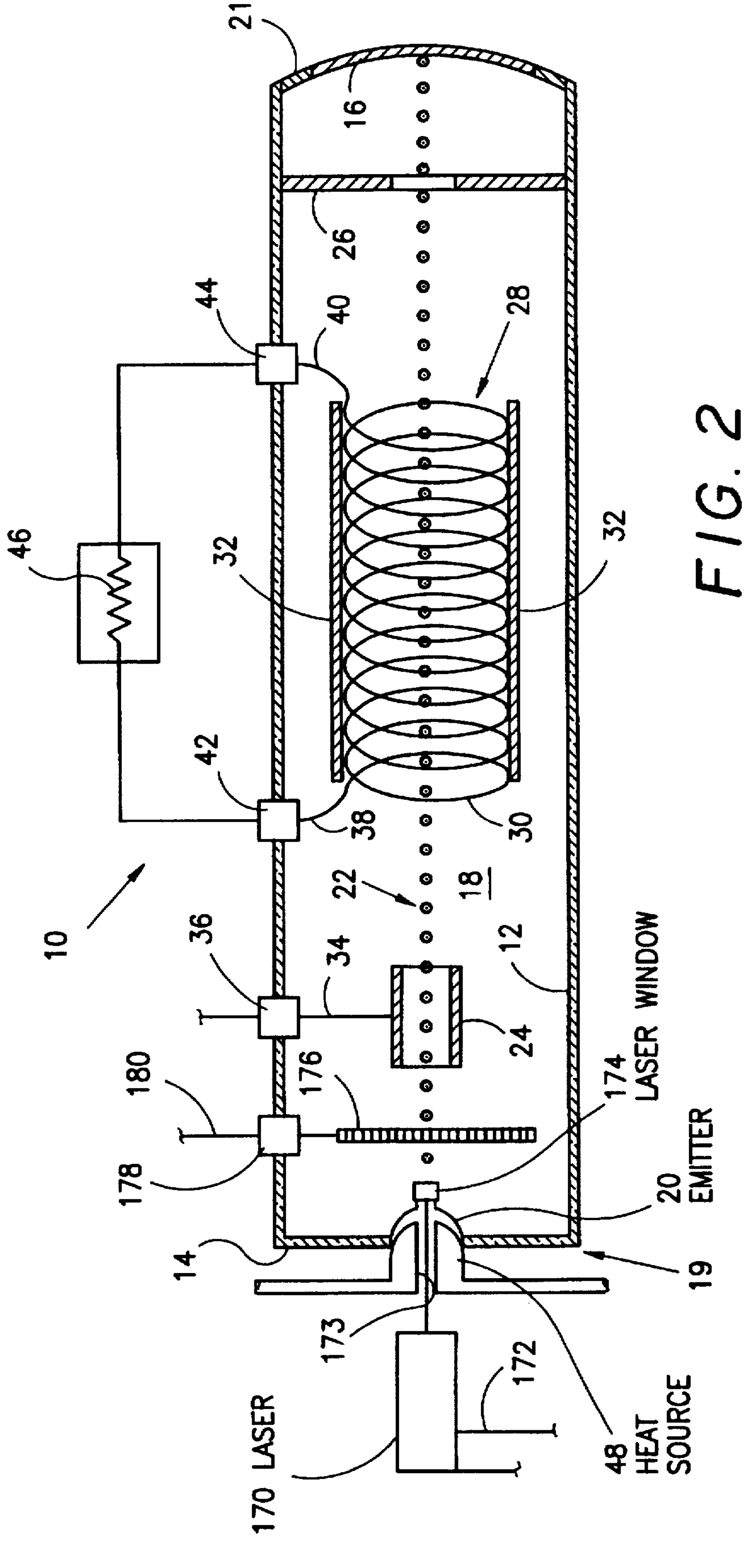
FIG. 2 PRIOR ART
FIG. 2 is a schematic diagram of a prior art laser-excited thermionic electric converter.

FIGS. 1 and 2 show prior art thermionic electric converters as shown and described in U.S. Pat. Nos. 4,303,845 and 4,323,808, respectively, both to Edwin D. Davis, the inventor of the present invention, the disclosures of which are incorporated by reference herein in their entirety. While the operation of both thermionic converters is described in detail in the incorporated patents, a general operational overview is presented herein with reference to FIGS. 1 and 2. This may provide background useful in understanding the present invention.

FIG. 1 shows a basic thermionic electric converter. FIG. 2 shows a laser-excited thermionic converter. The operation of both converters is very similar.

With reference to the FIGS., a basic thermionic electric converter 10 is shown. The converter 10 has an elongated, cylindrically shaped outer housing 12 fitted with a pair of end walls 14 and 16, thereby forming a closed chamber 18. The housing 12 is made of any of a number of known strong, electrically non-conductive materials, such as, for example, high-temperature plastics or ceramics, while the end walls 14, 16 are metallic plates to which electrical connections may be made. The elements are mechanically bonded together and hermetically sealed such that the chamber 18 may support a vacuum, and a moderately high electrical potential may be applied and maintained across the end walls 14 and 16.

The first end wall 14 contains a shaped cathode region 20 having an electron emissive coating (not shown) disposed on its interior surface, while the second end wall 16 is formed as a circular, slightly convex surface which is first mounted in an insulating ring 21 to form an assembly, all of which is then mated to the housing 12. In use, the end walls 14 and 16 function respectively as the cathode terminal and the collecting plate of the converter 10. Between these two walls, an electron stream 22 will flow substantially along the axis of symmetry of the cylindrical chamber 18, originating at the cathode region 20 and terminating at the collecting plate 16.

An annular focusing element 24 is concentrically positioned within the chamber 18 at a location adjacent to the cathode 20. A baffle element 26 is concentrically positioned within the chamber 18 at a location adjacent to the collecting plate 16.

Disposed between these two elements is an induction assembly 28 comprised of a helical induction coil 30 and an elongated annular magnet 32. The coil 30 and the magnet 32 are concentrically disposed within, and occupy the central region of, the chamber 18. Referring briefly to the schematic end view of FIG. 2, the relative radial positioning of the various elements and assemblies may be seen. For clarity of presentation, the mechanical retaining means for these interiorly located elements have not been included in either figure. Focusing element 24 is electrically connected by means of a lead 34 and a hermetically sealed feed through 36 to an external source of static potential (not shown). The induction coil 30 is similarly connected via a pair of leads 38 and 40 and a pair of feed-throughs 42 and 44 to an external load element shown simply as a resistor 46.

The potentials applied to the various elements are not explicitly shown nor discussed in detail as they constitute well known and conventional means for implementing related electron stream devices. Briefly, considering (conventionally) the cathode region 20 as a voltage reference level, a high, positive static charge is applied to the collecting plate 16 and the external circuit containing this voltage source is completed by connection of its negative side to the cathode 20. This applied high, positive static charge causes the electron stream 22 which originated at the cathode region 20 to be accelerated towards the collecting plate 16 with a magnitude directly dependent upon the magnitude of the high static charge applied. The electrons impinge upon the collecting plate 16 at a velocity sufficient to cause a certain amount of ricochet. The baffle element 26 is configured and positioned to prevent these ricochet electrons from reaching the main section of the converter, and electrical connections (not shown) are applied thereto as required. A negative voltage of low to moderate level is applied to the focusing element 24 for focusing the electron stream 22 into a narrow beam. In operation, a heat source 48 (which could be derived from diverse sources such as combustion of fossil fuels, solar devices, atomic devices, atomic waste or heat exchangers from existing atomic operations) is used to heat the electron emissive coating on the cathode 20, thereby boiling off quantities of electrons. The released electrons are focused into a narrow beam by focusing element 24 and are accelerated towards the collecting plate 16. While transiting the induction assembly 28, the electrons come under the influence of the magnetic field produced by the magnet 32 and execute an interactive motion which causes an EMF to be induced in the turns of the induction coil 30. Actually, this induced EMF is the sum of a large number of individual electrons executing small circular current loops thereby developing a correspondingly large number of minute EMFs in each winding of the coil 30. Taken as a whole, the output voltage of the converter is proportional to the velocity of the electrons in transit, and the output current is dependent on the size and temperature of the electron source. The mechanism for the induced EMF may be explained in terms of the Lorentz force acting on an electron having an initial linear velocity as it enters a substantially uniform magnetic field orthogonally disposed to the electron velocity. In a properly configured device, a spiral electron path (not shown) results, which produces the desired net rate of change of flux as required by Faraday's law to produce an induced EMF.

This spiral electron path results from a combination of the linear translational path (longitudinal) due to the acceleration action of collecting plate 16 and a circular path (transverse) due to the interaction of the initial electron velocity and the transverse magnetic field of magnet 32. Depending on the relative magnitude of the high voltage applied to the collecting plate 16 and the strength and orientation of the magnetic field produced by the magnet 32, other mechanisms for producing a voltage directly in the induction coil 30 may be possible. The mechanism outlined above is suggested as an illustrative one only, and is not considered as the only operating mode available. All mechanisms, however, would result from various combinations of the applicable Lorentz and Faraday considerations.

The basic difference between the basic converter shown in U.S. Pat. No. 4,303,845 and the laser-excited converter shown in U.S. Pat. No. 4,323,808, is that the laser-excited converter collects electrons boiled off the surface of the cathode on a grid 176 having a small negative potential applied thereon by a negative potential source 178 through lead 180, which traps the electron flow and mass of electrons. The electrical potential imposed on the grid is removed, while the grid is simultaneously exposed to a laser pulse discharge from laser assembly 170, 173, 174, 20 causing a bolus of electrons 22 to be released. The electron bolus 22 is then electrically focused and directed through the interior of the air core induction coils located within a transverse magnetic field, thereby generating an EMF in the induction coil which is applied to an external circuit to perform work, as set forth above with respect to the basic thermionic converter.

As set forth the present inventor's prior U.S. Pat. 5,459,367, there are numerous attendant disadvantages usually associated with having a collecting element simply made up of a conductive metal plate. Therefore, the collecting element of that design includes a conductive layer of copper sulfate gel impregnated with copper wool fibers. The present invention may use such an anode. However, the present invention also may use a conductive metal plate anode as other aspects of the present invention will minimize or avoid some of the disadvantages that such a plate anode might otherwise cause. Basically then, the specifics of the anode are not central to the preferred design of the present invention.

Figures 3, 4, 5, 6, 7, 8:
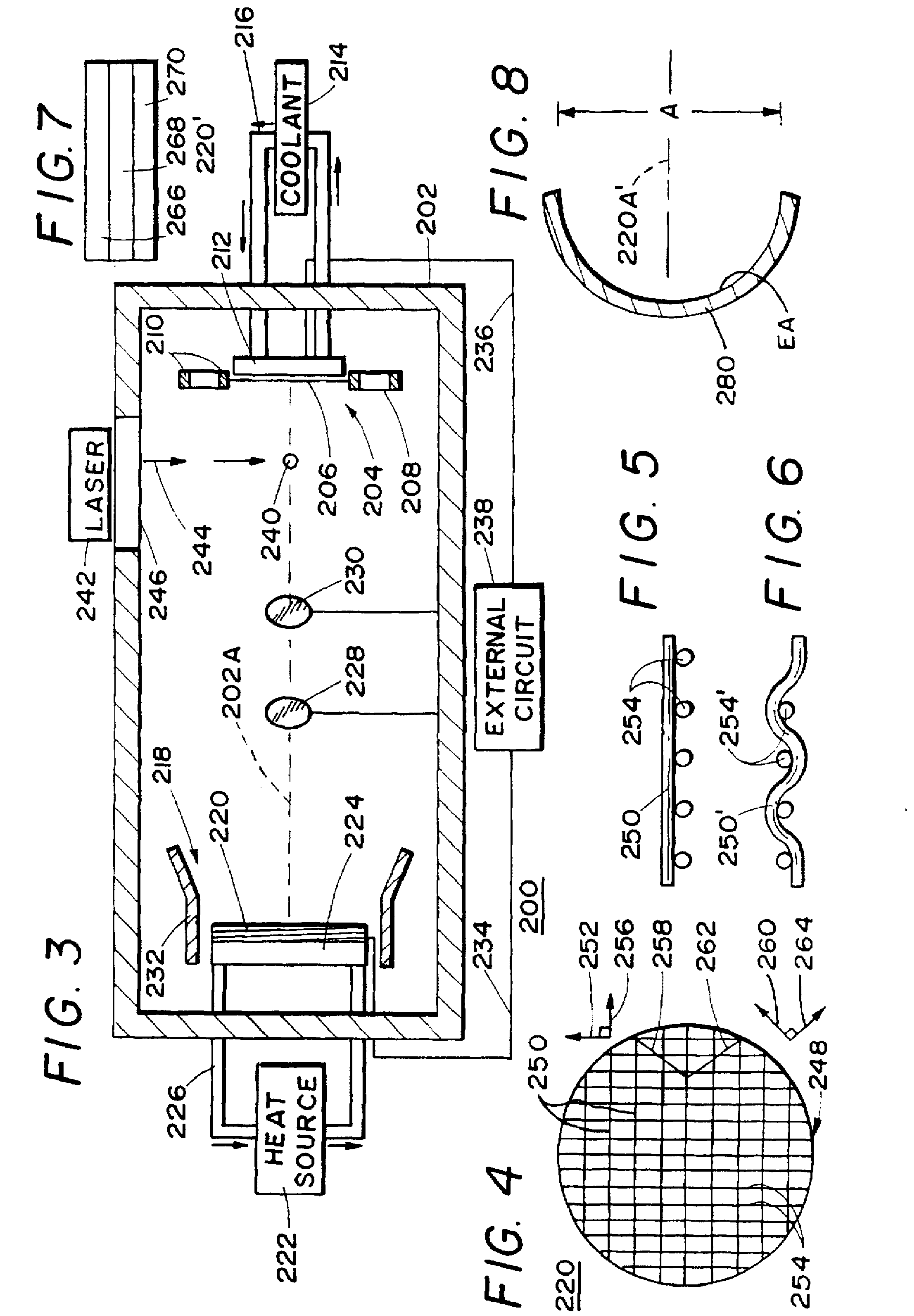
FIG. 3 is a side view with parts in cross section and schematic diagram of a thermionic electric converter according to the present invention.
FIG. 4 is a top view of a wire grid structure used for a cathode.
FIG. 5 is a side view of a part of the wire grid structure.
FIG. 6 is a side view of a part of an alternate wire grid structure.
FIG. 7 is a side schematic diagram multiple layers in a wire grid structure.
FIG. 8 is a simplified side view of an alternate cathode structure.

With reference now to FIG. 3, a thermionic electric converter 200 according to the present invention includes a casing member 202 in which a vacuum would be maintained by vacuum apparatus (not shown) in known fashion. The casing member 202 is preferably cylindrical about a central axis 202A which serves as an axis of symmetry of the member 202 and the components therein except where otherwise noted.

The collector 204 may include a flat anode circular plate 206 (made of copper for example) surrounded by a statically charged ring 208 (charged to 1000 Coulombs for example) having insulating rings 210 concentric therewith. The ring 208 and rings 210 may be constructed and operable as discussed in the U.S. Pat. No. 5,459,367. A cooling member 212 is thermally coupled to the plate 206 such that coolant from coolant source 214 is recirculated therethrough by coolant circuit 216. The cooling member 212 maintains the anode plate at a desired temperature. The cooling member 212 may alternately be the same as the anode plate 206 (in other words coolant would circulate through plate 206). A feedback arrangement (not shown) using one or more sensors (not shown) could be used to stabilize the temperature of anode 206.

The cathode assembly 218 of the present invention includes a cathode 220 heated by a heat source such that it emits electrons which generally move along movement direction 202A towards the anode 206. (As in the U.S. Pat. No. 5,459,367, the charged ring 208 helps attract the electrons towards the anode.) Although the heat source is shown as a source 222 of heating fluid (liquid or gas) flowing to heating member 224 (which is thermally coupled to the cathode 220) via heating circuit 226, alternate energy sources such as a laser applied to the cathode 224 might be used. The energy input into source 222 could be solar, laser, microwave, or radioactive materials. Further, used nuclear fuel that would otherwise simply be stored at great expense and without benefit might be used to provide the heat to source 222.

Electrons energized to the Fermi level in cathode 220 escape from the surface thereof and, attracted by static charge ring 208, travel along movement direction 202A through first and second focussing rings or cylinders 228 and 230, which may be constructed and operable in similar fashion focussing element 24 of the prior art arrangement discussed above. In order to help the electrons move in the proper direction a shield 232 may surround the cathode 224. The shield 232 may be cylindrical or conical or, as shown, include a cylindrical portion closest the cathode 224 and a conical portion further from the cathode 224. In any case, the shield tends to keep electron movement in direction 202A. The electrons will tend to be repelled from the shield 232 since the shield will be at a relatively high temperature (from its proximity to the relatively high temperature cathode 220). Alternately, or additionally, to being repelled by the high temperature of the shield, the shield 232 could have a negative charge applied to it. In the later case, insulation (not shown) could be used between the shield 232 and cathode 220.

The electrical energy produced corresponding to electron flow from cathode 220 to anode 206 is supplied via cathode wire 234 and anode wire 236 to an external circuit 238.

Turning from the overall operation of the converter 200 to specific advantageous aspects thereof, electrons such as electron 240 tend to have a high energy level as they approach the anode 206. Therefore, the normal tendency would be for some to bounce off the surface and not be captured therein. This normally results in electron scatter and diminishes the conversion efficiency of a converter. In order to avoid or greatly reduce this tendency, the present invention uses a laser 242 which hits the electrons (e.g., hits them with a laser beam 244) just before they hit the anode 206. The quantum interference between the photons of the laser beam 244 and the electrons 240 drops the energy state of the electrons such that they are more readily captured by the surface of anode 206.

As will be understood from the dual wave-particle theory of physics, the electrons hit by the laser beam may be exhibiting properties of waves and/or particles. (Of course, the scope of the claims on the present invention are not limited to any particular theory of operation unless and except where a claim expressly references such a theory of operation, such as quantum interference.)

As used herein, saying that the laser 242 hits the electrons with beam 244 "just before" the electrons reach the anode 206 means that the electrons which have been hit do not pass through any other components (such as a focussing member) as they continue to the anode 206. More specifically, the electrons are preferably hit within 2 microns of when they reach the anode 206. Even more preferably, the electrons are hit by the laser with 1 microns of reaching the anode 206. Indeed, the distance from the second focussing element 230 to the anode 206 may be 1 micron and the laser may hit electrons closer to the anode 206. In that fashion (i.e., hitting the electrons just before they reach the anode), the energy of the electrons is reduced at a point where reduced energy is most appropriate and useful.

Although casing member 202 may be opaque, such as a metal member, a laser window 246 is made of transparent material such that the laser beam 244 can travel from laser 242 into the chamber within member 202. Alternately, the laser 242 could be disposed in the chamber.

In addition to improving conversion efficiency by using the laser 242 to reduce the energy level of electrons just before they reach the anode 206, the cathode 220 of the present invention is specifically designed to improve efficiency by increasing the electron emission area of the cathode 220.

With reference to FIG. 4, the cathode 220 is shown as a circular grid of wires 248. Wires 250 of a top or first layer of parallel wires extend in direction 252, whereas wires 254 of a second layer of parallel wires extend in direction 256, transverse to direction 252 and preferably perpendicular to direction 252. A third layer of parallel wires (only one wire 258 shown for ease of illustration) extend in direction 260 (45 degrees from directions 252 and 256. A fourth layer of parallel wires (only one wire 262 shown for ease of illustration) extend in direction 264 (90 degrees from direction 260).

It should also be noted that FIG. 4 shows the wires with relatively large separation distances between them but this is also for ease of illustration. Preferably, the wires are finely extruded wires and the separation distances between parallel wires in the same layer would be similar to the diameter of the wires. Preferably, the wires have diameters of 2 mm or less to fine filament size. The wires may be tungsten or other metals used in cathodes.

With reference to FIG. 5, the wires 250 and 254 may be offset from each other with all wires 250 (only one shown in FIG. 5) disposed in a common plane offset from a different common plane in which all wires 254 are disposed. An alternate arrangement shown in FIG. 6 has wires 250' (only one visible) and 254' which are interwoven in the manner of fabric.

With reference to FIG. 7, an alternate cathode 220' may have three portions 266, 268, and 270. Each of portions 266, 268, and 270 may have two perpendicular layers of wires (not shown in FIG. 7) such as 250 and 254 (or 250' and 254'). Portion 266 would have wires going into the plane of view of FIG. 7 and wires parallel to the plane of FIG. 7. Portion 268 has two layers of wires, each having wires extending in a direction 30 degrees from one of the directions of the wires for portion 266. Portion 270 has two layers of wires, each layer having wires extending in a direction 60 degrees from one of the directions of the wires for portion 266.

It will be appreciated that FIG. 7 is illustrative of the point that multiple layers of wires extending in different directions could be used.

The various wire grid structures for the cathode increase the effective electron emission surface area by way of the shape of the wires and their multiple layers. An alternative way of increasing the surface area is illustrated in FIG. 8. FIG. 8 shows a side cross section view of a parabolic cathode 280 operable to emit electrons for movement generally along movement direction 220A'. The cathode 280 has a planar cross section area A normal to the movement direction 202A. Significantly, the cathode 280 has an electron emission surface area EA (from the curvature of the cathode) for electron emission towards the anode which is at least 30 percent greater than the planar cross section area A. Thus, a greater density of electrons are generated for a given size cathode. Although the cathode 280 is shown as a parabola, other curved surfaces may be used. The cathode 280 may be made of a solid member or may also incorporate multiple layer wire grid structures like described for FIGS. 4–7 except that each layer would be curved and not planar.

Although the curved cathode arrangement of FIG. 8 provides an electron emission surface area EA that is at least 30 percent greater than the side cross section area A, the various wire grid arrangements such as FIG. 4 provide an electron emission surface area that is at least double the side cross section area (i.e., defined as shown for FIG. 8). Indeed, the electron emission surface area in the grid arrangements should be at least ten times the side cross section area.

Advantageously, the present invention allows the cathode 220 and anode 206 to be offset from each other by from 4 microns to 5 cm. More specifically, that offset or separation distance will be from 1 to 3 cm. Thus, the cathode and anode are sufficiently far apart that heat from the cathode is less likely to be conveyed to the anode than in the arrangements where the cathode and anode must be in close proximity. Therefore, the coolant source 214 can be a relatively low coolant demand arrangement since less cooling is required than in many prior designs.

While the invention has been described in conjunction with specific embodiments thereof, it is evident that many alternatives, modifications and variations will be apparent to those skilled in the art. Accordingly, the preferred embodiments of the invention, as set forth herein, are intended to be illustrative, not limiting. Various changes may be made without departing from the spirit and scope of the invention as defined herein and in the following claims.

What is claimed is:

1. A thermionic electric converter comprising:

a casing member;

a cathode within the casing member operable when heated to serve as a source of electrons; and an anode within the casino member operable to receive electrons emitted from the cathode; and wherein the cathode is a wire grid having wires going in at least two directions that are transverse to each other; and further comprising a laser operable to hit electrons between the cathode and anode.

2. The thermionic electric converter of claim 1 further comprising a charged first focusing ring in the casing member, between the cathode and the anode, and operable to direct electrons emitted by the cathode through the first focusing ring on their way to the anode.

3. The thermionic electric converter of claim 2 further comprising a charged second focusing ring in the casing member, between the first focusing ring and the anode, and operable to direct electrons emitted by the cathode through the second focusing ring on their way to the anode.

4. The thermionic electric converter of claim 1 wherein the cathode is separated from the anode by 4 microns to five centimeters.

5. The thermionic electric converter of claim 4 wherein the cathode is separated from the anode by one to three centimeters.

6. The thermionic electric converter of claim 1 wherein the cathode is a wire grid having wires going in at least two directions that are transverse to each other.

7. The thermionic electric converter of claim 1 wherein the laser is operable is hit electrons just before they reach the anode.

8. The thermionic electric converter of claim 7 wherein the laser is operable to provide quantum interference with the electrons such that electrons are more readily captured by the anode.

9. The thermionic electric converter of claim 1 wherein the wire grid of the cathode includes at least four layers of wires.

10. The thermionic electric converter of claim 9 wherein each of the wire layers has wires extending in a different direction from each of the other of the wire layers, the wire grid of the cathode thus including wires extending in at least four different directions.

11. The thermionic electric converter of claim 1 wherein the cathode is curved in at least one direction perpendicular to the movement direction.

12. A thermionic electric converter comprising:

a casing member;

a cathode within the casing member operable when heated to serve as a source of electrons; and an anode within the casing member operable to receive electrons emitted from the cathode; and a laser operable to hit electrons between the cathode and anode, thus providing quantum interference with the electrons such that electrons are more readily captured by the anode.

13. The thermionic electric converter of claim 12 wherein the laser is operable to hit electrons just before they reach the anode.

14. The thermionic electric converter of claim 13 wherein the laser is operable to hit electrons within 2 microns of when they reach the anode.

15. The thermionic electric converter of claim 14 wherein the cathode is a wire grid having wires going in at least two directions that are transverse to each other.

16. The thermionic electric converter of claim 15 a separation distance between the cathode and the anode is from 4 microns to five centimeters.

17. The thermionic electric converter of claim 16 wherein the electron emission surface area is at least ten times the planar cross section area.

18. A thermionic electric converter comprising:

a casing member;

a cathode within the casing member operable when heated to serve as a source of electrons; and an anode within the casino member operable to receive electrons emitted from the cathode and which proceed generally along a movement direction defining the direction from the cathode to the anode; and wherein the cathode has a planar cross section area normal to the movement direction, the cathode has an electron emission surface area for electron emission towards the anode, and wherein the electron emission surface area is at least 30 percent greater than the planar cross section area; and further comprising a laser operable to hit electrons between the cathode and anode just before they reach the anode, and wherein the electron emission surface area is at least double the planar cross section area.

* * * * *

UNITED STATES PATENT AND TRADEMARK OFFICE

CERTIFICATE OF CORRECTION

PATENT NO. : 5,780,954
DATED : July 14, 1998
INVENTOR(S) : Edwin D. DAVIS

It is certified that error appears in the above-indentified patent and that said Letters Patent is hereby corrected as shown below:

Claim 1, line 5, (column 9, line 3) change "casino" to -- casing --;

Claim 18, line 5, (column 10, line 31) change "casino" to -- casing --.

Signed and Sealed this

Tenth Day of November 1998

Attest:

BRUCE LEHMAN

*Attesting Officer*

*Commissioner of Patents and Trademarks*